United States Patent Office 3,216,243
Patented Nov. 9, 1965

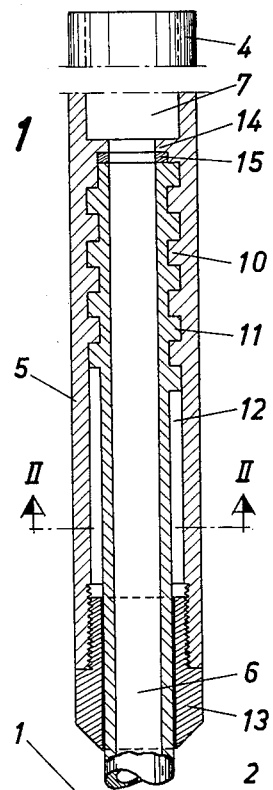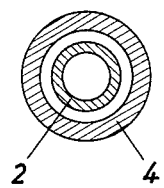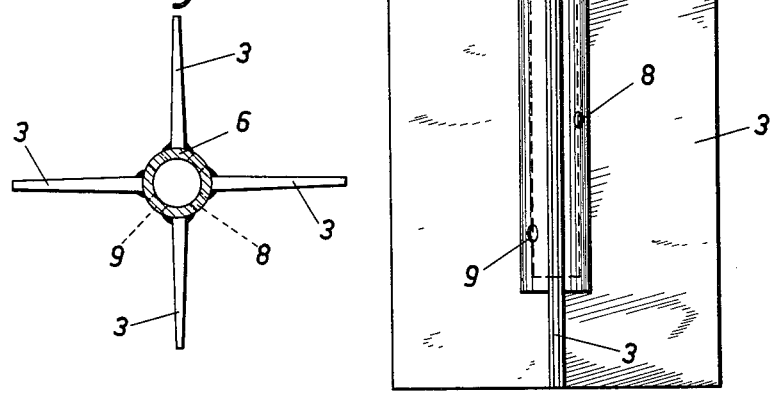

3,216,243
APPARATUS FOR DETERMINATION OF THE INTERNAL RESISTANCE OF A MASS
Allan Bergfelt, Topeliusgatan 1, Goteborg, Sweden, and Simon Hultgren, Karl Gustavsgatan 33B, Goteborg, Sweden
Filed Nov. 23, 1962, Ser. No. 239,593
4 Claims. (Cl. 73—101)

Measuring apparatus are known having a wing device, and by the rotation of this wing device the interior resistance of a mass can be determined. Such apparatus are used e.g. for the determination of the resistance in cohesion earths, e.g. clay. When used for earth examinations the measuring device is commonly denoted a wing drill. Such a drill has been described in the German Patent No. 508,711 of the year 1929.

With some of these previously known measuring apparatus there is measured the total resistance against rotation of the wing device and against the driving part of the apparatus, said driving part being shaped as a rod. In other cases the resistance against this rod is at least partly eliminated in that it is rotated freely within a surrounding tube, the latter keeping the clay out of contact with the rod. Since some time in the nineteen forties in some cases one has arranged a protection about the wing device in such a way that the wings are protected against influences during the driving down of the drill into the soil but are still permitted to be protruded so as to enable them to freely work during the continued rotation.

It has now turned out that the measuring exactness could be considerably increased in case the resistance against the driving down of the rod can be distinguished from the rotation resistance of the wing device. The above recited protection tube is from this point of view of great importance but has from the practical point of view the drawback that, at the driving down of the drill, it requires at each one of the joints a bringing together of a rod as well as of a tube. The operation is rather time wasting.

From the Swedish Patent No. 134,834 a measuring apparatus is known of the kind in which the driving rod of the apparatus is rotational relatively to the wing device but only for a part of a revolution. With such a device the resistance of the driving rod will be highly varying and as the indicated value is to be subtracted from the total resistance value it is of course not possible to determine exactly the resistance value of the clay close to the wings.

The present invention has reference to such measuring apparatus for the above explained purpose which comprises a wing device composed of a number of wings extending radially from a rod and a driving rod to be coupled to the rod of the wing device in such a way that a relative rotation of said two rods is possible. The main feature of the invention is to be seen therein that the coupling is constructed such that it permits a rotation of the driving rod an arbitrary number of revolutions relative to the wing device and renders possible a recoupling of said rod to said wing device so as to bring the same along in the rotation of the driving rod in a way known per se.

This device makes it possible, at the measuring of the resistance and the carrying capacity of the clay, to obtain exact values also at considerable depths. Due to the fact that the driving rod can be turned an arbitrary number of revolutions without bringing along the wing device it is possible to loosen the clay material around the driving rod to such an extent that the resistance will be rather small and in any case exactly the same for each revolution of the driving rod. The indicated value is then subtracted from the total resistance which is obtained with the apparatus and indicated after the wing device has been coupled to the driving rod and is turned together with the same.

According to a further embodiment of the invention the wing device can be provided with outlet channels for liquid, said channels being in communication with an axial bore in the driving rod and the rod of the wing device. Due to this device it is rendered possible to loosen the clay around the wing device and the driving rod. Thereby the driving down of the apparatus is facilitated and the resistance against the rotation of the driving rod is further reduced whereby the measuring exactness is increased especially of the clay after the agitation. It is often of great value to know the resistance of the clay before as well as after the agitation of the same. As an example may be mentioned the driving down of piles for reinforcement of the ground. At the driving, the clay material in the vicinity of the pile becomes often rather loose (aqueous) due to the vibrations and it is very important to determine the carrying capacity of the pile immediately after the driving or a short time thereafter, i.e. before the clay has become compact again. The present apparatus makes it possible to determine also at considerable depths the time the clay needs for becoming compact again.

An example of a device in accordance with the invention will now be described with reference to the accompanying partly diagrammatic drawing, in which:

FIG. 1 is a partly cut side elevation of the lower portion of a measuring device according to the invention, FIG. 2 shows a cross section on the line II—II in FIG. 1 through the coupling of the apparatus, and FIG. 3 shows a cross section on the line III—III in FIG. 1 through the rod of the wing device.

The main parts of the measuring apparatus as shown in the drawings are the wing device 1 with a number of wings 3 extending radially from its axial rod 2, the driving rod 4 and a coupling 5 between the rods 2 and 4. The rods 2 and 4 are provided with an axial percolation channel 6 and 7, respectively, and the rod 2 and the wing device are between the wings 3 provided with outlet openings 8, 9 for liquid, e.g. water, lowered through the measuring device.

The coupling 5, which makes it possible at one state of the measurings to rotate the driving rod 4 alone and at another state to turn said rod 4 together with the wing device 1, can be designed in many different ways but it comprises in the shown embodiment a screw coupling. The driving rod 4 is at some distance from its lower end provided with internal threads 10 which fit to corresponding external threads 11 at the upper end of the rod 2. Below the threads 10 there is in the driving rod 4 a chamber 12 serving for a free wheeling of the part with threads 11 when the wing device rod 2 is in its lower, disconnected position. The chamber 12 is at its lower end closed by an end nut 13 which is freely passed through by the rod 2. Between an inner annular shoulder 14 on rod 4 and the upper end of the rod 2 there is arranged a tightening ring 15 which prevents leakage of liquid at the joint when the rods 2 and 4 are coupled together for rotation in common.

Upon rotation to the right and when the driving rod 4 is pressed axially against the rotation rod 2, the coupling is screwed together and when the threads of the rod 4 reach the bottom, i.e. when the upper end of the rod 2 is pressed against the tightening ring 15, the rod 4 brings the wing device 1 along in its rotation. By means of a rotation to the left the driving rod 4 can be completely freed from the wing device whereby the coupling is screwed apart and the screw threads 11 on the rod 2 run idle in the chamber 12. The rod 4 can be turned an unlimited number of revolutions without bringing along the wing device. The threads 10 and 11 are preferably shaped as square threads and the washer 15 should be manufactured from a rather hard material with a low friction resistance, e.g. a fiber washer, whereby the loosening of the coupling is facilitated.

At great depths or in case the driving rod 4 has passed through a harder earth layer the resistance against the turning of the driving rod can be rather considerable. Even though by means of this measuring apparatus this resistance could be distinguished from total resistance, which includes the turning resistance of the wing device, the resistance value of the wing device will be so small that the measuring exactness will be unsatisfactory.

So as to reduce the rotation resistance along the driving rod 4 water can be sprayed through the apertures 8 and 9, possibly with some added chemicals, along the rod so as to reduce the adhesion between the same and the surrounding earth. It is even possible to flush a hole around the rod in such a way that said rod can be freely turned. This flushing can be facilitated so that the wing device 1 during the driving down of the measuring device has been rotated in such a way that the earth is disintegrated. Hereby, the resistance against the turning of the driving rod can be reduced to such an extent that the resistance of the wing device can be determined with great exactness.

During the driving down the measuring device could meet earth layers of such a hardness that it will be very difficult to press the wing device through them. In earth layers not too hard the difficulties could be avoided in that the wing device in a way known per se is surrounded by a strong protection sleeve. In harder earth layers it may be necessary to extract the whole measuring apparatus and instead drive down a kind of an impact drill or a jet drill by means of which the hard layer is penetrated whereupon the drill is removed and the measuring apparatus is thereupon again driven down.

This operation is rendered possible by means of the coupling 5 shown in the drawing. The invention also makes it possible to use the measuring apparatus as a jet drill when needed. In this case it will not be necessary to extract the measuring apparatus from the test hole.

The present invention has been described in detail above for purposes of illustration only and is not intended to be limited by this description or otherwise except as defined in the appended claims. The apparatus may as already mentioned be provided with a protection tube and the latter could be provided with spacers.

What we claim is:

1. Apparatus for determining the internal resistance of a mass, which includes a wing rod provided at its lower end with a plurality of wings for rotational contact with the interior of the mass, a rotatable driving rod, and means for coupling said driving rod to said wing rod in order to enable rotation of the latter, said coupling means being so constructed that, as desired, said driving rod can be disengaged from said wing rod and rotated freely with respect to said wing rod without breaking the overall connection between the driving rod and the wing rod.

2. Apparatus according to claim 1, in which said coupling means is so constructed that, when said driving rod is engaged with or disengaged from said wing rod, the driving rod is moved axially with respect to the wing rod.

3. Apparatus according to claim 1, in which the lower end of said driving rod and the upper end of said wing rod are arranged in overlapping relationship with respect to each other, and in which said coupling means is provided by a threaded portion adjacent the lower end of said driving rod, a correspondingly threaded portion adjacent the upper end of said wing rod, and an annular space between said two rods constituting a free-wheeling chamber for one of said threaded portions, whereby, upon rotation of said driving rod in one direction, said threaded portions are engaged with each other and, upon rotation of said driving rod in the opposite direction, said threaded portions are disengaged from each other with one of said threaded portions then occupying said free-wheeling chamber.

4. Apparatus according to claim 1, in which said driving rod and said wing rod are each provided with an axial bore, said axial bores being in communication with each other, and said wing rod is also provided with openings for the discharge of liquid introduced into said axial bores out into the mass in contact with said wing rod.

References Cited by the Examiner

UNITED STATES PATENTS

| | | | |
|---|---|---|---|
| 1,524,677 | 2/25 | Thompson. | |
| 2,603,967 | 7/52 | Carlson | 73—101 |
| 2,709,363 | 5/55 | Lea | 73—101 X |
| 2,907,204 | 10/59 | Gibbs | 73—101 |
| 2,993,367 | 7/61 | Fletcher et al. | 73—101 |
| 3,062,045 | 11/62 | Sokjer-Petersen et al. | 73—101 |

FOREIGN PATENTS

| | | |
|---|---|---|
| 134,834 | 3/52 | Sweden. |

RICHARD C. QUEISSER, *Primary Examiner.*

DAVID SCHONBERG, *Examiner.*